United States Patent
Melton et al.

(10) Patent No.: US 8,826,667 B2
(45) Date of Patent: Sep. 9, 2014

(54) SYSTEM AND METHOD FOR FLOW CONTROL IN GAS TURBINE ENGINE

(75) Inventors: Patrick Benedict Melton, Horse Shoe, NC (US); Bradley Donald Crawley, Simpsonville, SC (US); David William Cihlar, Greenville, SC (US); Robert Joseph Rohrssen, Simpsonville, SC (US); Ronald James Chila, Greer, SC (US)

(73) Assignee: General Electric Company, Schenectady, NY (US)

( * ) Notice: Subject to any disclaimer, the term of this patent is extended or adjusted under 35 U.S.C. 154(b) by 293 days.

(21) Appl. No.: 13/115,018

(22) Filed: May 24, 2011

(65) Prior Publication Data

US 2012/0297783 A1 Nov. 29, 2012

(51) Int. Cl.
*F02C 1/00* (2006.01)
*F02G 3/00* (2006.01)

(52) U.S. Cl.
USPC ............................................. 60/752; 60/772

(58) Field of Classification Search
USPC ........... 60/752–760, 796, 742, 740, 737, 772, 60/776
See application file for complete search history.

(56) References Cited

U.S. PATENT DOCUMENTS

| | | |
|---|---|---|
| 4,249,372 A | 2/1981 | White |
| 4,557,107 A | 12/1985 | Violett et al. |
| 4,609,328 A | 9/1986 | Cirrito |
| 4,624,425 A | 11/1986 | Austin et al. |
| 4,974,416 A | 12/1990 | Taylor |
| 5,001,896 A | 3/1991 | Hilt et al. |
| 5,154,049 A | 10/1992 | Ford et al. |
| 5,239,822 A | 8/1993 | Buchacher |
| 5,505,587 A | 4/1996 | Ghetzler |
| 5,647,215 A * | 7/1997 | Sharifi et al. .................... 60/737 |
| 5,749,218 A | 5/1998 | Cromer et al. |
| 5,896,742 A | 4/1999 | Black et al. |
| 6,192,688 B1 * | 2/2001 | Beebe ............................. 60/723 |
| 6,220,015 B1 | 4/2001 | Mina |
| 6,270,309 B1 | 8/2001 | Ghetzler et al. |
| 6,334,294 B1 | 1/2002 | Belsom et al. |
| 6,668,542 B2 | 12/2003 | Baker et al. |
| 6,868,676 B1 * | 3/2005 | Haynes ........................... 60/776 |
| 6,912,838 B2 | 7/2005 | Sileo et al. |
| 6,983,601 B2 | 1/2006 | Koshoffer |
| 7,143,583 B2 | 12/2006 | Hayashi et al. |
| 7,149,632 B1 | 12/2006 | Gao |
| 7,665,797 B1 | 2/2010 | Brosseau |
| 7,690,895 B2 | 4/2010 | Moroz |
| 7,703,286 B2 | 4/2010 | Morenko et al. |
| 7,712,302 B2 | 5/2010 | Nichols et al. |

(Continued)

OTHER PUBLICATIONS

U.S. Appl. No. 13/115,009, filed May 24, 2011, Cihlar et al.

(Continued)

*Primary Examiner* — Craig Kim
(74) *Attorney, Agent, or Firm* — Fletcher Yoder P.C.

(57) ABSTRACT

A system includes a gas turbine combustor, which includes a combustion liner disposed about a combustion region, a flow sleeve disposed about the combustion liner, an air passage between the combustion liner and the flow sleeve, and a structure extending between the combustion liner and the flow sleeve. The structure obstructs an airflow path through the air passage. The gas turbine combustor also includes an aerodynamic wake reducer configured to redirect an airflow around the structure to reduce a wake region downstream of the structure.

22 Claims, 5 Drawing Sheets

(56) References Cited

U.S. PATENT DOCUMENTS

| | | |
|---|---|---|
| 7,886,541 B2 * | 2/2011 | Woolford et al. .............. 60/755 |
| 2004/0035114 A1 | 2/2004 | Hayashi et al. |
| 2004/0172952 A1 | 9/2004 | Sileo et al. |
| 2005/0262847 A1 | 12/2005 | Koshoffer |
| 2006/0271311 A1 | 11/2006 | Gao et al. |
| 2007/0151260 A1 | 7/2007 | Nichols et al. |
| 2009/0139241 A1 | 6/2009 | Hirata et al. |
| 2009/0260340 A1 | 10/2009 | Hessler et al. |
| 2010/0037620 A1 | 2/2010 | Chila |
| 2010/0186416 A1 * | 7/2010 | Chen et al. .............. 60/755 |
| 2010/0192578 A1 | 8/2010 | Singh et al. |

OTHER PUBLICATIONS

U.S. Appl. No. 13/115,051, filed May 24, 2011, Melton et al.
U.S. Appl. No. 13/115,058, filed May 24, 2011, Melton et al.
U.S. Appl. No. 13/115,063, filed May 24, 2011, Crawley et al.

* cited by examiner

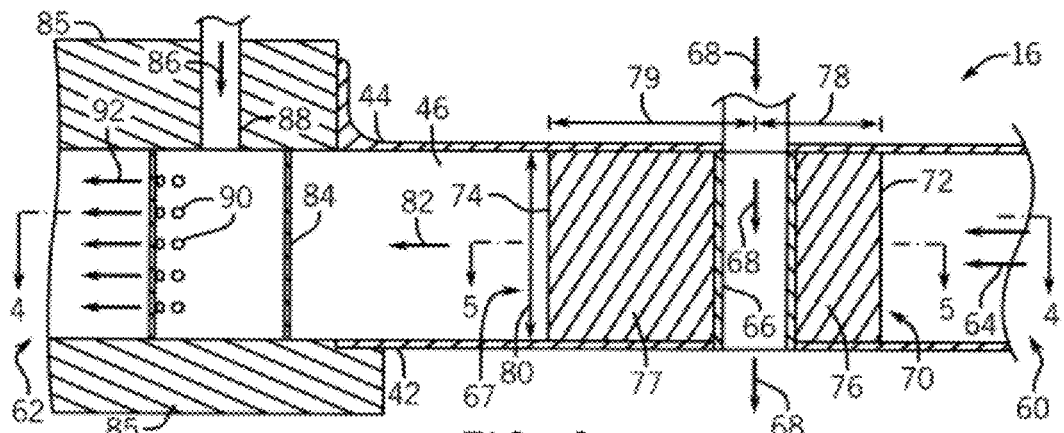
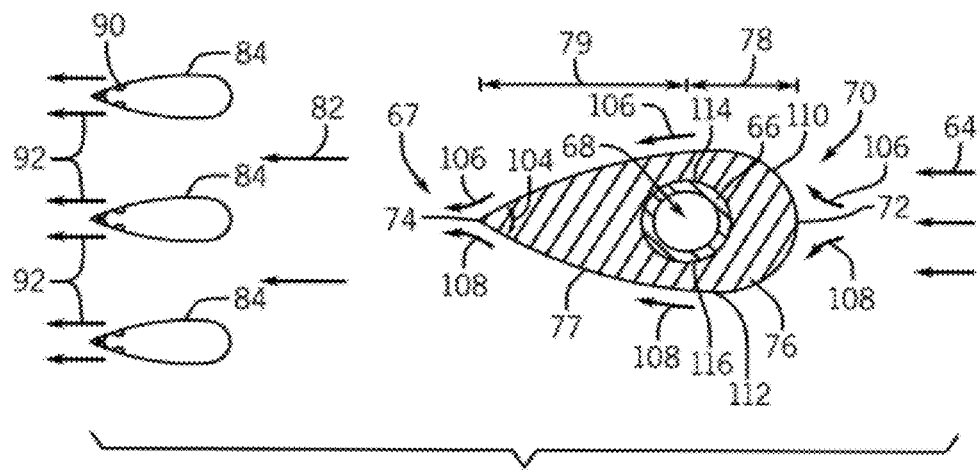
FIG. 3
FIG. 4
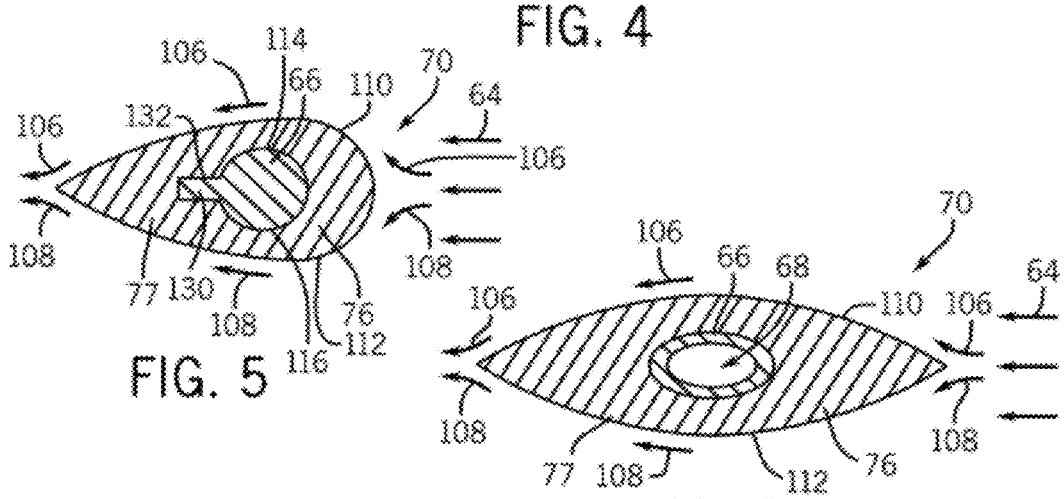
FIG. 5
FIG. 6

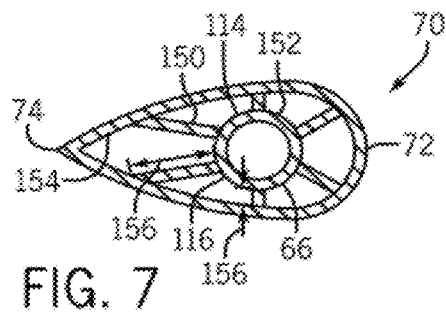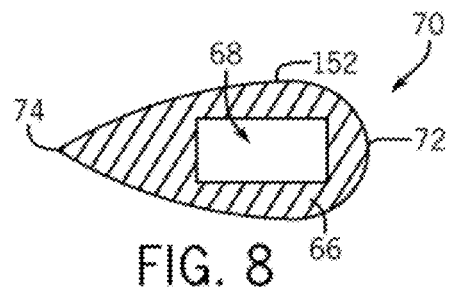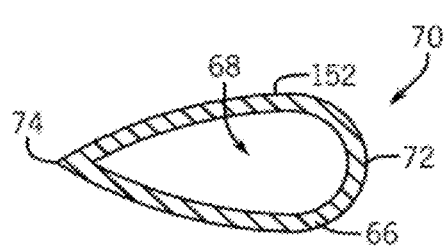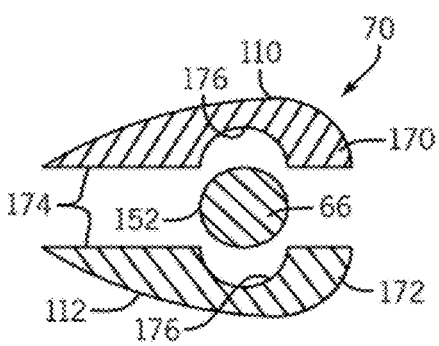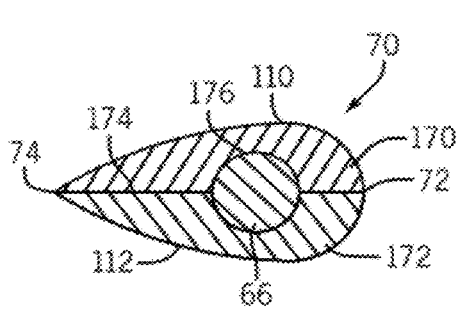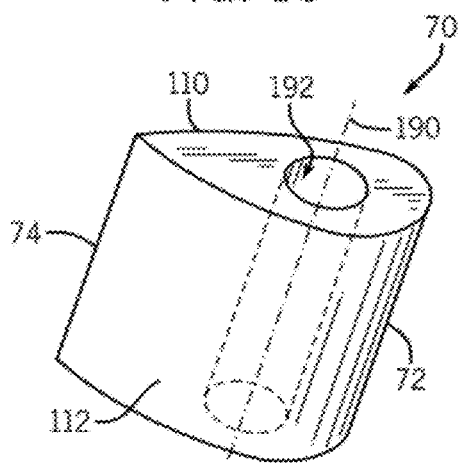

SYSTEM AND METHOD FOR FLOW CONTROL IN GAS TURBINE ENGINE

BACKGROUND OF THE INVENTION

The subject matter disclosed herein relates to combustion systems, and, more particularly, to flow control within gas turbine engines.

Various combustion systems include combustion chambers in which fuel and air combust to generate hot gases. For example, a gas turbine engine may include one or more combustion chambers that are configured to receive compressed air from a compressor, inject fuel into the compressed air, and generate hot combustion gases to drive the turbine engine. Each combustion chamber may include one or more fuel nozzles, a combustion zone within a combustion liner, a flow sleeve surrounding the combustion liner, and a gas transition duct. Compressed air from the compressor flows to the combustion zone through a gap between the combustion liner and the flow sleeve. Structures may be disposed in the gap to accommodate various components, such as crossfire tubes, flame detectors, and so forth. Unfortunately, flow disturbances may be created as the compressed air passes by such structures, thereby decreasing performance of the gas turbine engine.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a gas turbine combustor, which includes a combustion liner disposed about a combustion region, a flow sleeve disposed about the combustion liner, an air passage between the combustion liner and the flow sleeve, and a structure extending between the combustion liner and the flow sleeve. The structure obstructs an airflow path through the air passage. The gas turbine combustor also includes an aerodynamic wake reducer configured to redirect an airflow around the structure to reduce a wake region downstream of the structure.

In a second embodiment, a system includes an aerodynamic turbine wake reducer configured to reduce a wake in a wake region downstream from a structure obstructing a gas flow of a gas turbine engine. The aerodynamic turbine wake reducer includes a flow control surface configured to at least partially surround the structure. In addition, the aerodynamic turbine wake reducer is disposed upstream of a fuel injector.

In a third embodiment, a method includes reducing a wake in a wake region downstream from a structure that obstructs an airflow between a combustion liner and a flow sleeve of a gas turbine combustor. Reducing the wake includes dividing the airflow into a first flow and a second flow and aerodynamically combining the first and second flows into the wake region.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 3 is a partial cross-sectional side view of an embodiment of the combustor as illustrated in FIG. 2, taken within line 3-3, illustrating an aerodynamic wake reducer;

FIG. 4 is a cross-sectional top view of an embodiment of an aerodynamic wake reducer and a plurality of fuel injectors taken along line 4-4 of FIG. 3;

FIG. 5 is a cross-sectional top view of an embodiment of an aerodynamic wake reducer taken along line 5-5 of FIG. 3;

FIG. 6 is a cross-sectional top view of an embodiment of an aerodynamic wake reducer taken along line 5-5 of FIG. 3;

FIG. 7 is a cross-sectional top view of an embodiment of an aerodynamic wake reducer taken along line 5-5 of FIG. 3;

FIG. 8 is a cross-sectional top view of an embodiment of an aerodynamic wake reducer taken along line 5-5 of FIG. 3;

FIG. 9 is a cross-sectional top view of an embodiment of an aerodynamic wake reducer taken along line 5-5 of FIG. 3;

FIG. 10 is a cross-sectional top view of an embodiment of an aerodynamic wake reducer before assembly;

FIG. 11 is a cross-sectional top view of the embodiment of the aerodynamic wake reducer of FIG. 10 after assembly;

FIG. 12 is a perspective view of an embodiment of an aerodynamic wake reducer;

DETAILED DESCRIPTION OF THE INVENTION

Figure 1:
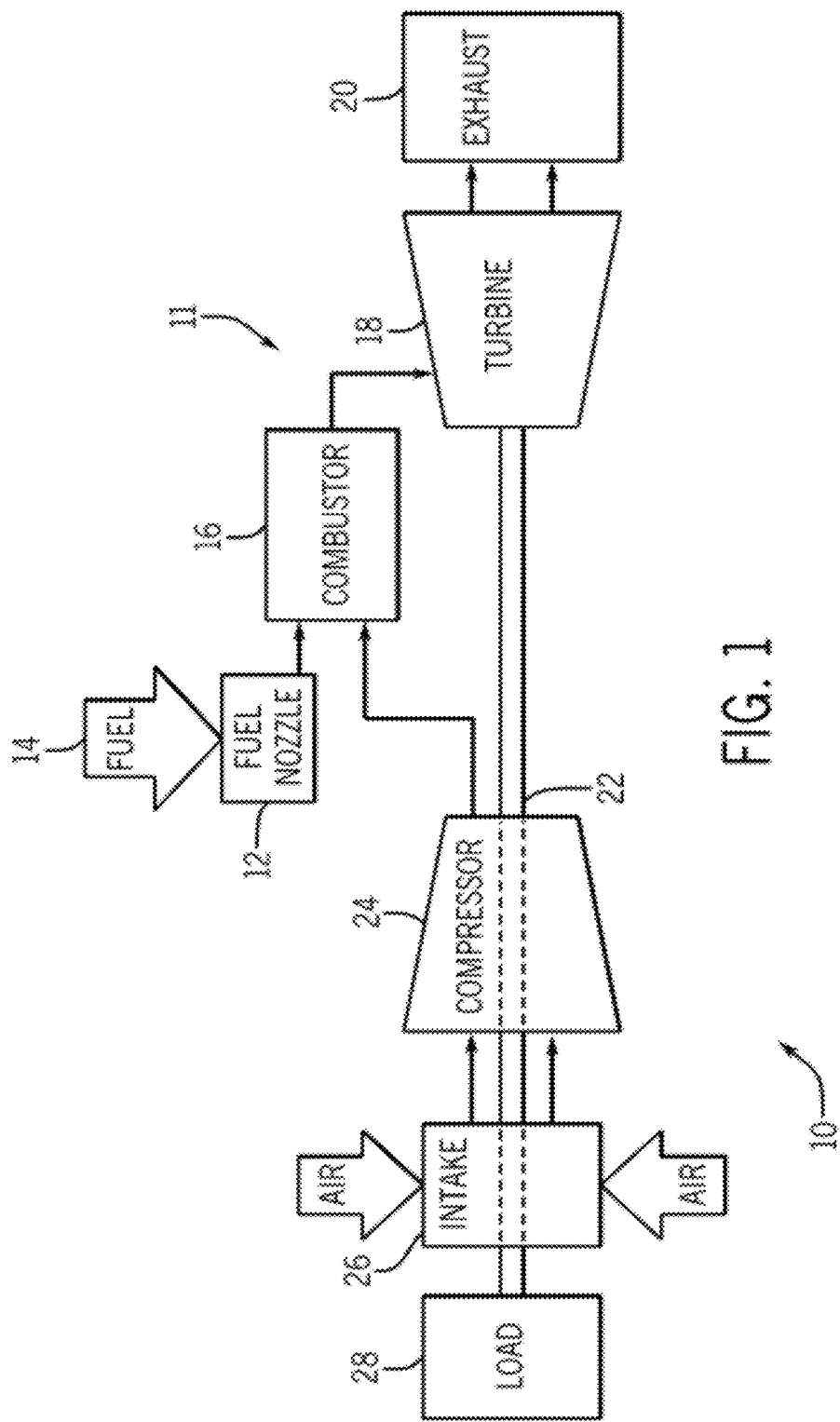
FIG. 1 is a block diagram of an embodiment of a turbine system having a combustor.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed in detail below, the disclosed embodiments provide systems and methods for reducing a wake in a wake region downstream from a structure obstructing a gas flow. For example, the structure may obstruct an airflow between a combustion liner and a flow sleeve of a gas turbine combustor of a gas turbine engine. An aerodynamic wake reducer may be disposed adjacent to, partially surrounding, or completely surrounding the structure and may direct a flow into the wake region downstream of the structure. The aerodynamic wake reducer may include a leading edge and a trailing edge, with flow control surfaces extending between the leading and trailing edges. In certain embodiments, the flow control surfaces may have an aerodynamic shape, such as an airfoil shape. For example, the flow control surfaces may first diverge and then converge toward one another. In the disclosed embodiments, the wake downstream of the structure is essentially filled with a higher velocity fluid, namely the portion of the gas flow leaving the trailing edge. Filling of the wake with the gas flow from the trailing edge helps to reduce the size and formation of the wake. In other words, the aerodynamic wake reducer is configured to reduce a low velocity region downstream of the structure obstructing the gas flow by gradually splitting the flow upstream of the structure and gradually recombining the flow downstream of the structure.

Reducing the wake in the wake region downstream from the structure may offer several benefits. For example, without the disclosed embodiments, fuel injected downstream of the structure may be pulled into the wake. The fuel may accumulate in the wake and cause flame holding, thereby decreasing performance of the gas turbine engine. In addition, the presence of wakes may result in a higher pressure drop across the combustion liner. The presently disclosed embodiments employ the aerodynamic wake reducer to reduce wakes and avoid the disadvantages of other methods of wake reduction. For example, using the aerodynamic wake reducer may reduce the possibility of flame holding, increase the gas turbine engine performance, and decrease the pressure drop across the combustion liner. In addition, the aerodynamic wake reducer may be less expensive, less complicated, easier to manufacture and install, and more reliable than other methods of wake reduction. Thus, use of the disclosed aerodynamic wake reducers is particularly well suited for reducing wakes in gas turbine engines and other combustion systems.

FIG. 1 is a block diagram of an embodiment of a turbine system 10 having a gas turbine engine 11. As described in detail below, the disclosed turbine system 10 employs one or more combustors 16 with an improved design to reduce wakes within an air supply passage of the combustor 16. The turbine system 10 may use liquid or gas fuel, such as natural gas and/or a synthetic gas, to drive the turbine system 10. As depicted, one or more fuel nozzles 12 intake a fuel supply 14, partially mix the fuel with air, and distribute the fuel and air mixture into the combustor 16 where further mixing occurs between the fuel and air. The air-fuel mixture combusts in a chamber within the combustor 16, thereby creating hot pressurized exhaust gases. The combustor 16 directs the exhaust gases through a turbine 18 toward an exhaust outlet 20. As the exhaust gases pass through the turbine 18, the gases force turbine blades to rotate a shaft 22 along an axis of the turbine system 10. As illustrated, the shaft 22 is connected to various components of the turbine system 10, including a compressor 24. The compressor 24 also includes blades coupled to the shaft 22. As the shaft 22 rotates, the blades within the compressor 24 also rotate, thereby compressing air from an air intake 26 through the compressor 24 and into the fuel nozzles 12 and/or combustor 16. The shaft 22 may also be connected to a load 28, which may be a vehicle or a stationary load, such as an electrical generator in a power plant or a propeller on an aircraft, for example. The load 28 may include any suitable device capable of being powered by the rotational output of turbine system 10.

Figure 2:
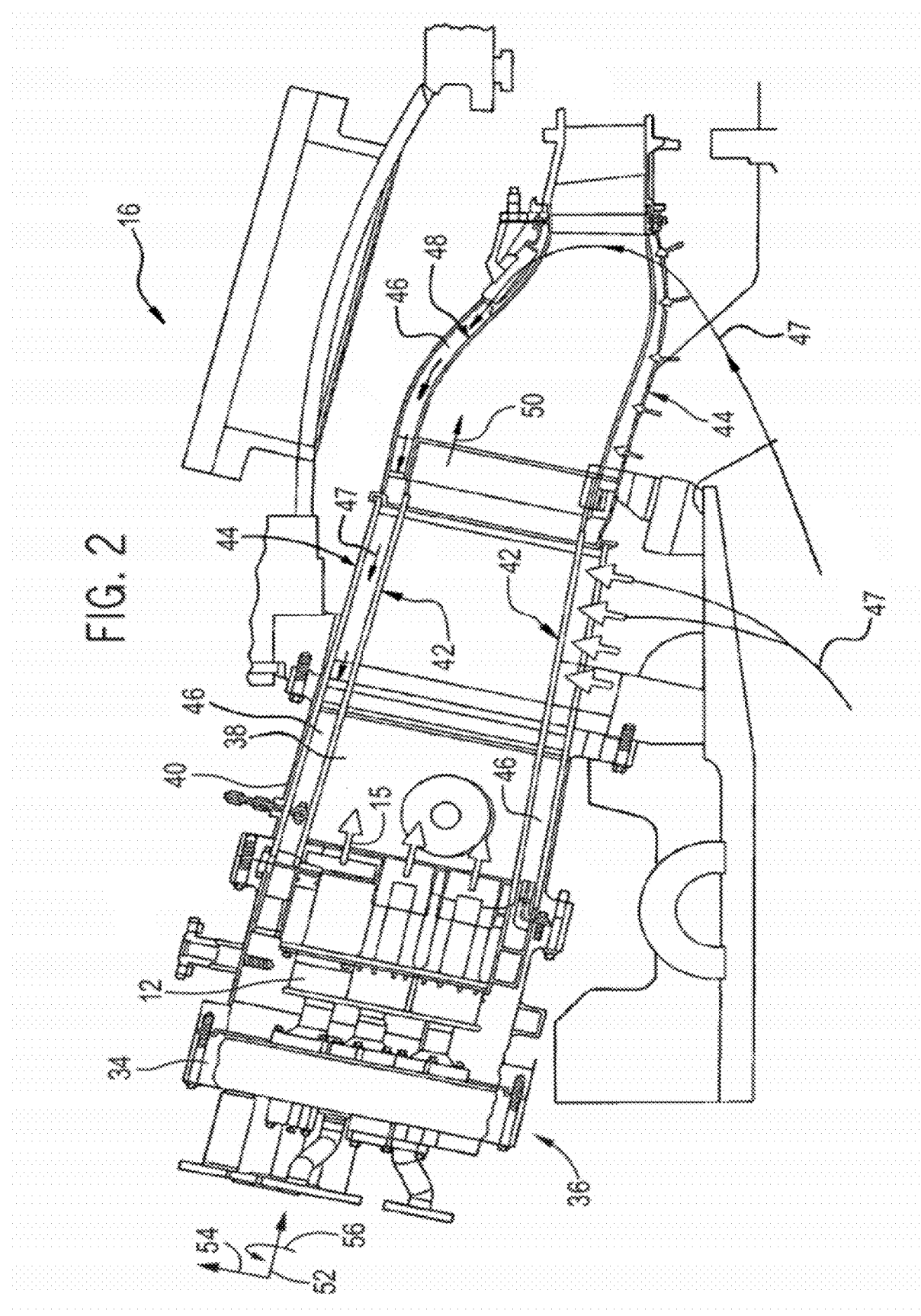
FIG. 2 is a cutaway side view of an embodiment of the turbine system as illustrated in FIG. 1, further illustrating details of the combustor.

FIG. 2 is a cutaway side view of an embodiment of the combustor 16 of the gas turbine engine 11, as illustrated in FIG. 1. In the following discussion, reference may be made to an axial direction or axis 52, a radial direction or axis 54, and a circumferential direction or axis 56, relative to a longitudinal axis 58 of the combustor 16. As illustrated, one or more fuel nozzles 12 are located inside the combustor 16, wherein each fuel nozzle 12 is configured to partially premix air and fuel within intermediate or interior walls of the fuel nozzles 12 upstream of the injection of air, fuel, or an air-fuel mixture into the combustor 16. For example, each fuel nozzle 12 may divert fuel into air passages, thereby partially premixing a portion of the fuel with air to reduce high temperature zones and nitrogen oxide ($NO_x$) emissions. Further, the fuel nozzles 12 may inject a fuel-air mixture 15 into the combustor 16 in a suitable ratio for optimal combustion, emissions, fuel consumption, and power output.

As illustrated in FIG. 2, the plurality of fuel nozzles 12 is attached to an end cover 34, near a head end 36 of the combustor 16. Compressed air and fuel are directed through the end cover 34 and the head end 36 to each of the fuel nozzles 12, which distribute the fuel-air mixture 15 into a combustion chamber 38 of the combustor 16. The combustion chamber 38, or combustion region, is generally defined by a combustion casing 40, a combustion liner 42, and a flow sleeve 44. As shown in FIG. 2, the flow sleeve 44 is disposed about the combustion liner 42. In certain embodiments, the flow sleeve 44 and the combustion liner 42 are coaxial with one another to define a hollow annular space 46, or annular air passage, which may enable passage of air 47 for cooling and for entry into the head end 36 and the combustion chamber 38. As discussed below, one or more aerodynamic wake reducers may be disposed in the hollow annular space 46 to reduce the wake associated with protruding structures in the space 46. For example, the aerodynamic wake reducers may surround the protruding structures to redirect the airflow around the structures to reduce the wake region downstream of the structures. In this manner, the aerodynamic wake reducer helps improve the flow, air-fuel mixing, and combustion downstream of the aerodynamic wake reducer. For example, downstream of the aerodynamic wake reducers, the fuel nozzles 12 inject fuel and air into the combustion chamber 38 to generate hot combustion gases, which then flow through the transition piece 48 to the turbine 18, as illustrated by arrow 50. The combustion gases then drive rotation of the turbine 18 as discussed above.

FIG. 3 is a partial cross-sectional side view of an embodiment of the combustor 16 as illustrated in FIG. 2 taken within line 3-3. As illustrated, the combustor 16 includes an upstream side 60 that receives a compressed airflow 64, and a downstream side 62 that outputs the compressed airflow 64 to the head end 36. Specifically, an airflow 64 enters the upstream side 60 of the annular space 46. Moving downstream from the upstream side 60, a structure 66 extends between the combustion liner 42 and the flow sleeve 44. Although shown extending completely between the combustion liner 42 and the flow sleeve 44 in FIG. 3, in other embodiments, a gap may exist between the structure 66 and one or both of the combustion liner 42 and the flow sleeve 44. Such a gap may allow for thermal expansion and/or movement of the structure 66, the combustion liner 42, and/or the flow sleeve 44 during operation of the gas turbine engine 11. The structure 66 obstructs the airflow 64 flowing through the annular space 46, creating a wake in a wake region 67 located downstream from the structure 66. The wake region 67 is a region of recirculating flow immediately behind the structure 66, caused by the flow of surrounding fluid around the structure 66. The structure 66 may include, but it not limited to, a cross-fire tube, a flame detector, a spark plug, a boss, a spacer, a pressure probe, an axially staged air injector, a sensor, or any similar object that may be found in the annular space 46 of the combustor 16 and that is capable of obstructing the airflow 64. In the illustrated embodiment, the structure 66 corresponds to a cross-fire tube, which extends between the combustor 16 and another combustor of the gas turbine engine 11. In other embodiments, the structure 66 may correspond to other internal flow passages similar to the cross-fire tube. Although the following discussion refers to the structure 66 as the cross-fire tube, in various embodiments, the structure 66 may correspond to any of the examples of structures 66 listed above. Returning to FIG. 3, a flame 68 from the other combustor is directed to the combustor 16 to ignite the air-fuel mixture in the combustion chamber 38.

In the illustrated embodiment, an aerodynamic wake reducer 70 may extend completely around the cross-fire tube 66 to reduce the wake in the wake region 67 downstream from the cross-fire tube 66. Specifically, the aerodynamic wake reducer 70 may include a leading edge 72 facing the upstream side 60 and a trailing edge 74 facing the downstream side 62. The leading edge 72 may also be referred to as the front end and the trailing edge 74 may be referred to as the back end. As described in more detail below, the airflow 64 encounters the aerodynamic wake reducer 70 at the leading edge 72 and leaves the aerodynamic wake reducer 70 from the trailing edge 74. In addition, the aerodynamic wake reducer 70 may be divided into an upstream portion 76, which is substantially upstream of a center of the cross-fire tube 66, and a downstream portion 77, which is substantially downstream of the center of the cross-fire tube 66. The upstream portion 76 may be defined by an upstream length 78 and the downstream portion 77 may be defined by a downstream length 79. In the illustrated embodiment, the upstream length 78 is less than the downstream length 79. In other embodiments the upstream and downstream lengths 78 and 79 may be approximately the same, or the upstream length 78 may be greater than the downstream length 79. For example, a ratio of the upstream length 78 to the downstream length 79 may be between approximately 0.1 to 10, 0.25 to 4, or 0.5 to 2. Further, in certain embodiments, the aerodynamic wake reducer 70 may be approximately the same height as a radial distance 80 between the combustion liner 42 and the flow sleeve 44. In other embodiments, the height of the aerodynamic wake reducer 70 may be less than the radial distance 80 to accommodate thermal expansion and/or movement of the various components of the combustor 16 during operation. In addition, in various embodiments, the aerodynamic wake reducer 70 may be coupled to the combustion liner 42, the flow sleeve 44, and/or the structure 66.

When the airflow 64 flowing toward the aerodynamic wake reducer 70 encounters the leading edge 72, the airflow 64 divides into two flows, as described in more detail below. The airflow 64 further away from the aerodynamic wake reducer 70 may bypass the aerodynamic wake reducer 70. The two divided flows of the airflow 64 flow along the surfaces of the aerodynamic wake reducer 70 and aerodynamically recombine near the trailing edge 74 to form a downstream airflow 82 in the wake region 67 extending from the cross-fire tube 66. Specifically, the aerodynamic wake reducer 70 may reduce a wake in the downstream airflow 82. In certain embodiments, the downstream airflow 82 may encounter one or more fuel injectors 84 disposed downstream of the cross-fire tube 66, the combustion liner 42, and the flow sleeve 44. Specifically, the fuel injectors 84 may be located in an annulus formed by a cap 85. In certain embodiments, the fuel injector 84 may be a quaternary injector that injects a portion of a fuel 86 into the downstream airflow 82 upstream from the fuel nozzles 12. The fuel 86 may be carried to the fuel injector 84 through a fuel manifold 88. In certain embodiments, one or more fuel openings 90 may be disposed in the fuel injector 84 facing toward the downstream side 62 of the combustor 16. The fuel 86 may mix with the downstream airflow 82 to form an air-fuel mixture 92 that then flows to the fuel nozzles 12.

FIG. 4 is a top cross-sectional view of an embodiment of the aerodynamic wake reducer 70 and the fuel injectors 84 along the line labeled 4-4 in FIG. 3. As shown in FIG. 4, the cross-fire tube 66 is completely surrounded by the aerodynamic wake reducer 70. In the illustrated embodiment, the cross-fire tube 66 has a circular cross-sectional shape. In other embodiments, as discussed in detail below, the cross-fire tube 66 may have other cross-sectional shapes, such as a rectangular cross-section or other suitable cross-sectional shape. As shown in FIG. 4, the aerodynamic wake reducer 70 has an aerodynamic cross-sectional shape, such as an airfoil shape. In other embodiments, as discussed in detail below, the aerodynamic wake reducer 70 may have other aerodynamic cross-sectional shapes, such as oval, tapered, or generally diverging-converging surfaces. The shape of the aerodynamic wake reducer 70, the upstream and downstream lengths 78 and 79, and other characteristics of the aerodynamic wake reducer 70 (e.g., width, length-to-width ratio, surface texture, and so forth) may be adjusted to achieve the desired reduction of the wake in the downstream airflow 82. In certain embodiments, a trailing edge angle 104 may be adjusted to provide either a wider or thinner appearance to the trailing edge 74. For example, the trailing edge angle 104 may be between approximately 10 to 80 degrees, 25 to 65 degrees, or 35 to 45 degrees. A leading edge angle may be adjusted in a similar manner.

As shown in FIG. 4, upon reaching the leading edge 72 of the aerodynamic wake reducer 70, the airflow 64 divides into a first flow 106 and a second flow 108. The first and second flows 106 and 108 aerodynamically combine near the trailing edge 74 to form the downstream airflow 82. Thus, the aerodynamically combined first and second flows 106 and 108 fill the wake region 67 downstream of the cross-fire tube 66, thereby reducing flow separation and reducing lateral spreading of the wake. In other words, without the aerodynamic wake reducer 70, the wake region 67 may include a low velocity region due to a significant gap between the first and second flows 106 and 108 at the trailing edge 74. In the illustrated embodiment, the first and second flows 106 and 108 gradually converge with one another to eliminate such a gap, thereby reducing the possibility of any low velocity region downstream of the trailing edge 74. In other words, the first and second flows 106 and 108 are guided toward one another by the aerodynamic wake reducer 70 to combine directly downstream of the trailing edge 74 to fill the wake region 67. In certain embodiments, more than one cross-fire tube 66 or other structure may be located within the aerodynamic wake reducer 70.

The aerodynamic wake reducer 70 shown in FIG. 4 includes a first surface 110 disposed adjacent to a first side 114 of the cross-fire tube 66. Similarly, the aerodynamic wake reducer 70 includes a second surface 112 disposed adjacent to a second side 116 of the cross-fire tube 66. The first and second sides 114 and 116 of the cross-fire tube 66 are opposite from one another. Together, the first and second surfaces 110 and 112 make up a flow control surface of the aerodynamic wake reducer 70. As shown in FIG. 4, the flow control surface curves around the cross-fire tube 66 from the leading edge 72 to the trailing edge 74. The first surface 110 extends between the leading edge 72 and the trailing edge 74 on the first side 114 of the cross-fire tube 66. Similarly, the second surface 112 extends between the leading edge 72 and the trailing edge 74 on the second side 116 of the cross-fire tube 66. In the illustrated embodiment, the first and second surfaces 110 and 112 first diverge and then converge toward one another (e.g., diverging-converging surfaces) along the first and second flows 106 and 108 from the leading edge 72 toward the trailing edge 74. As the first and second flows 106 and 108 aerodynamically combine near the trailing edge 74, they energize the wake region 67 by filling the region 67 with high velocity airflow. In this manner, the aerodynamic wake reducer 70 substantially reduces or eliminates a low velocity recirculation zone downstream of the cross-fire tube 66.

As shown in FIG. 4, the annular space 46 may include more than one fuel injector 84. Each of the fuel injectors 84 may have an aerodynamic cross-sectional shape. Such a configuration of the fuel injectors 84 may reduce a wake in the air-fuel mixture 92 downstream of the fuel injectors 84. Reduction of the wake in the wake region 67 behind the cross-fire tube 66 using the aerodynamic wake reducer 70 may offer several benefits. For example, less of the fuel 86 may be pulled into the wake region 67 behind the cross-fire tube 66. This may reduce the possibility of flame holding of the gas turbine engine 11 and/or enable a higher percentage of fuel injection for increased performance of the gas turbine engine 11. In addition, the overall pressure drop through the annular space 46 and across the fuel injectors 84 may be reduced through reduction of the wake by the aerodynamic wake reducer 70. Thus, use of the aerodynamic wake reducer 70 may improve uniformity of airflow and air-fuel mixing upstream of the head end 36, thereby improving airflow and air-fuel mixing in the fuel nozzles 12.

FIG. 5 is a top cross-sectional view of another embodiment of the aerodynamic wake reducer 70 taken along line 5-5 of FIG. 3. As shown in FIG. 5, the structure 66 does not include an internal opening, such as that of the cross-fire tube shown in previous embodiments. Instead, the structure 66 may be a solid object, such as a flame detector, a spark plug, a boss, a spacer, a pressure probe, an axially staged air injector, or a sensor, for example. In the illustrated embodiment, the structure 66 includes a first alignment feature 130 and the aerodynamic wake reducer 70 includes a second alignment feature 132. The first and second alignment features 130 and 132 mate with one another to align the aerodynamic wake reducer 70 with the airflow 64. As shown in FIG. 5, the first alignment feature 130 may be a male alignment portion (e.g., a tab) and the second alignment feature 132 may be a female alignment portion (e.g., a notch). In other embodiments, the first alignment feature 130 may be the female alignment portion and the second alignment feature 132 may be the male alignment portion. In the absence of the first and second alignment features 130 and 132, the aerodynamic wake reducer 70 may rotate about the structure 66, because of the circular cross-sectional shape of the structure 66. In other embodiments in which the structure does not have a circular cross-sectional shape, the first and second alignment features 130 and 132 may be omitted. In certain embodiments, the structure 66 and the aerodynamic wake reducer 70 may be coupled together via adhesives, welds, brazes, bolts, screws, mechanical joints, or other suitable fasteners. In addition, one or both of the structure 66 and the aerodynamic wake reducer 70 may be coupled to one or both of the combustion liner 42 and the flow sleeve 44.

FIG. 6 is a top cross-sectional view of an embodiment of the aerodynamic wake reducer 70 and the cross-fire tube 66 taken along line 5-5 of FIG. 3. As shown in FIG. 6, both the aerodynamic wake reducer 70 and the cross-fire tube 66, or similar structure, have oval cross-sectional shapes. In other words, the aerodynamic wake reducer 70 and the cross-fire tube 66 may have a bullet shape, an airfoil shape, an elongated shape, or other similar shape. For example, the cross-fire tube 66 may be an elongated structure having a curved cross-section. Thus, the cross-sectional shapes of the aerodynamic wake reducer 70 and the cross-fire tube 66 in the illustrated embodiment are not circular. As discussed above, the aerodynamic wake reducer 70 and the cross-fire tube 66 may not include the first and second alignment features 130 and 132 shown in FIG. 5. Instead, the oval cross-sectional shape of the cross-fire tube 66 may help to align the aerodynamic wake reducer 70 with the airflow 64. In other respects, the embodiment of the aerodynamic wake reducer 70 shown in FIG. 6 is similar to that of the previously discussed embodiments. In addition, in other embodiments, the aerodynamic wake reducer 70 may be used with structures that do not include an internal opening, such as the structure 66 shown in FIG. 5.

FIG. 7 is a top cross-sectional view of an embodiment of the aerodynamic wake reducer 70 taken along line 5-5 of FIG. 3. As shown in FIG. 7, the aerodynamic wake reducer 70 is not completely solid, but is an aerodynamic, or airfoil, shaped wall surrounding the cross-fire tube 66. In other words, a gap, or offset distance, exists between the aerodynamic shaped wall of the wake reducer 70 and the cross-fire tube 66. Such a configuration of the aerodynamic wake reducer 70 may reduce the weight and cost of the aerodynamic wake reducer 70, be more adaptable to a variety of cross-fire tubes 66 and other structures, and simplify assembly between the aerodynamic wake reducer 70 and the cross-fire tube 66. One or more supports 150 are attached to an exterior surface 152 of the cross-fire tube 66 and an interior surface 154 of the aerodynamic shaped wall of the wake reducer 70 to couple the aerodynamic wake reducer 70 to the cross-fire tube 66. The supports 150 may be struts, beams, or similar components made from materials similar to those used for the aerodynamic wake reducer 70. Suitable methods of fastening objects together, such as, but not limited to, adhesives, welds, brazes, bolts, screws, mechanical joints, and other fasteners, may be used to join the supports 150 to the aerodynamic shaped wall of the wake reducer 70 and the cross-fire tube 66. As shown in FIG. 7, not all of the supports 150 are configured the same. For example, lengths 156 of the supports 150 near the first and second sides 114 and 116 of the cross-fire tube 66 may be shorter than lengths 156 of the supports 150 near the trailing edge 74 because of the airfoil shape of the aerodynamic wake reducer 70. The lengths 156 may also be referred to as offset distances.

FIG. 8 is a top cross-sectional view of another embodiment of the aerodynamic wake reducer 70 taken along line 5-5 of FIG. 3. As shown in FIG. 6, the cross-fire tube 66 and the aerodynamic wake reducer 70 are a one-piece structure. In other words, the exterior surface 152 of the cross-fire tube 66 has an aerodynamic cross-sectional shape. Such a configuration of the aerodynamic wake reducer 70 may be useful in new installations of gas turbine engines 11, because of its simpler construction. In contrast, a multi-piece aerodynamic wake reducer 70 may be useful when retrofitting an existing gas turbine engine 11. Further, although the shape of the passage through which the flame 68 flows through the cross-fire tube 66 is rectangular in FIG. 8, the shape may be different in other embodiments. For example, the shape of the passage through the cross-fire tube 66 may be a square, an oval, a circle, a hexagon, or any other shape.

FIG. 9 is a top cross-sectional view of a further embodiment of the aerodynamic wake reducer 70 and the cross-fire tube 66 taken along line 5-5 of FIG. 3. As shown in FIG. 9, the cross-fire tube 66 and the aerodynamic wake reducer 70 are a one-piece structure similar to that shown in FIG. 8. However, in FIG. 9, the shape of the passage through which the flame 68 flows through the cross-fire tube 66 is substantially the same as the airfoil shape of the exterior surface 152 of the cross-fire tube 66. Such a configuration of the aerodynamic wake reducer 70 may reduce the weight and cost of the aerodynamic wake reducer 70. In addition, a larger passage for the flame 68 to flow through may reduce a pressure drop of the flame 68.

FIG. 10 is a top cross-sectional view of an embodiment of the aerodynamic wake reducer 70 prior to assembly. As shown in FIG. 10, the aerodynamic wake reducer 70 includes a first component 170 and a second component 172, which are configured to mate with one another. Specifically, flat surfaces 174 may be configured to join with one another and curved surfaces 176 may be configured to join with the exterior surface 152 of the structure 66. Such a two-piece construction of the aerodynamic wake reducer 70 may be useful when retrofitting an existing gas turbine engine 11. In other words, installation of the aerodynamic wake reducer 70 may be accomplished without removal or movement of the structure 66. Suitable fastening techniques, such as, but not limited to, adhesives, welds, brazes, bolts, screws, mechanical joints, and other fasteners, may be used to join the first and second components 170 and 172 with one another. FIG. 11 is a top cross-sectional view of the embodiment of the aerodynamic wake reducer 70 shown in FIG. 10 after assembly. As shown in FIG. 11, the aerodynamic wake reducer 70 completely surrounds the structure 66.

FIG. 12 is a perspective view of another embodiment of the aerodynamic wake reducer 70. As shown in FIG. 12, a cylindrical hole 192 is formed through an interior of the aerodynamic wake reducer 70 along an axis 190. The axis 190 also passes through the center of the structure 66. Thus, the aerodynamic wake reducer 70 may be slid down or moved over the structure 66. Such an assembly technique may be used prior to installation of the structure 66 in the gas turbine engine 11 or when either the combustion liner 42 or the flow sleeve 44 is removed. In further embodiments, the aerodynamic wake reducer 70 and the structure 66 may include first and second alignment features 130 and 132 similar to those shown in FIG. 5.

Figure 13:
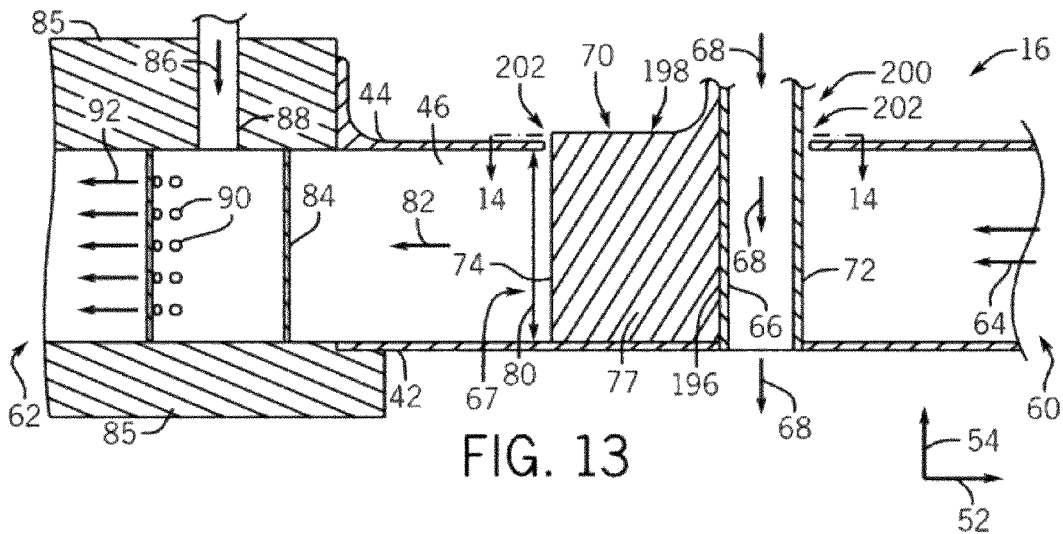
FIG. 13 is a partial cross-sectional side view of an embodiment of the combustor as illustrated in FIG. 2, taken within line 3-3, illustrating an aerodynamic wake reducer.

FIG. 13 is a partial cross-sectional side view of an embodiment of the combustor 16 as illustrated in FIG. 2 taken within line 3-3. As illustrated, the aerodynamic wake reducer 70 extends partially around the cross-fire tube 66. Specifically, the aerodynamic wake reducer 70 includes the downstream portion 77 coupled to a downstream surface 196 of the cross-fire tube 66 facing the downstream side 62. Thus, the cross-fire tube 66 and the aerodynamic wake reducer 70 collectively define an aerodynamic cross-sectional shape (e.g., an aerodynamic tube structure 198), such as an airfoil shape. In other embodiments, the cross-fire tube 66 and the aerodynamic wake reducer 70 may collectively define other aerodynamic cross-sectional shapes, such as oval, tapered, or generally diverging-converging surfaces.

As shown in FIG. 13, the downstream portion 77 includes the trailing edge 74 and the cross-fire tube 66 includes the leading edge 72. Such an arrangement of the cross-fire tube 66 and the aerodynamic wake reducer 70 may be used to facilitate assembly of the combustor 16. Specifically, an opening 200 may be formed in the flow sleeve 44. As described in detail below, the cross-sectional shape of the opening 200 may correspond to the cross-sectional shape of the aerodynamic tube structure 198 (e.g., the cross-fire tube 66 and the aerodynamic wake reducer 70). During assembly of the combustor 16, the aerodynamic tube structure 198 (e.g., the cross-fire tube 66 and the aerodynamic wake reducer 70) may be inserted radially 54 through the opening 200 into the annular space 46 between the flow sleeve 44 and the combustion liner 42, rather than inserting the aerodynamic tube structure 198 axially 52 into the annular space 46. For example, the aerodynamic tube structure 198 may be inserted radially 54 through the opening 200 as a single unit, rather than separately installing and/or interlocking the cross-fire tube 66 and the aerodynamic wake reducer 70 in the axial direction 52. After insertion, a gap 202 may exist between the aerodynamic tube structure 198 (e.g., the cross-fire tube 66 and the aerodynamic wake reducer 70) and the flow sleeve 44. In certain embodiments, the gap 202 may be configured to be small enough to reduce leakage of gases through the gap 202. In other embodiments, a seal may be disposed in the gap 202 to help block any gases from flowing through the gap 202.

By inserting the cross-fire tube 66 and the aerodynamic wake reducer 70 radially 54 through the opening 200, the aerodynamic wake reducer 70 may be configured to extend any portion or all of the radial distance 80 between the combustion liner 42 and the flow sleeve 44, thereby providing wake reduction across any portion or all of the radial distance 80. If the aerodynamic tube structure 198 (e.g., the cross-fire tube 66 and the aerodynamic wake reducer 70) was installed axially 52 rather than radially 54 into the annular space 46, then the height of the aerodynamic wake reducer 70 may be less than the radial distance 80 to enable the aerodynamic wake reducer 70 to move past other structures in the annular space 46. For example, the combustion liner 42 may include a raised ferrule to engage with the cross-fire tube 66. Therefore, the height of the aerodynamic wake reducer 70 may be reduced to enable the aerodynamic tube structure 198 to clear the raised ferrule of the combustion liner 42 when moved axially 52 into the annular space 46, thereby potentially reducing the amount of wake reduction. Inserting the aerodynamic tube structure 198 radially 54 through the opening 200 enables the aerodynamic wake reducer 70 to provide wake reduction across any portion or all of the radial distance 80.

Figure 14:
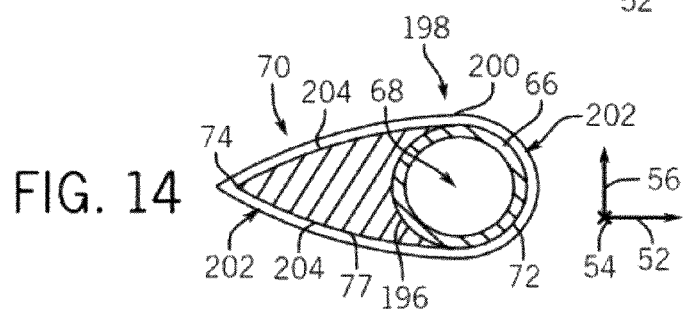
FIG. 14 is a cross-sectional top view of an embodiment of an aerodynamic wake reducer taken along line 14-14 of FIG. 13.

FIG. 14 is a top cross-sectional view of an embodiment of the aerodynamic wake reducer 70 taken along line 14-14 of FIG. 13. As shown in FIG. 14, the aerodynamic wake reducer 70 is coupled to the downstream surface 196 of the cross-fire tube 66. In certain embodiments, the aerodynamic wake reducer 70 and the cross-fire tube 66 may be manufactured as two separate components and coupled together via adhesives, welds, brazes, bolts, screws, mechanical joints, or other suitable fasteners. In other embodiments, the aerodynamic wake reducer 70 and the cross-fire tube 66 may be machined, formed, or cast from one bar stock. As shown in FIG. 14, the aerodynamic wake reducer 70 has a generally triangular cross-sectional shape with straight external sides 204, thus having the appearance of an aerodynamic fairing. In other embodiments, the aerodynamic wake reducer 70 may have other cross-sectional shapes and/or may have curved external sides 204. In addition, the embodiment of the aerodynamic wake reducer 70 shown in FIG. 14 has a tapered trailing edge 74. Further, the cross-sectional shape of the opening 200 generally corresponds to the cross-sectional shape of the cross-fire tube 66 and the aerodynamic wake reducer 70, thereby reducing the gap 202. In other words, the opening 200 may be described as an airfoil shaped opening. The gap 202 may be reduced to help reduce leakage of gases through the gap 202 or the size of any seal installed in the gap 202.

Figure 15:
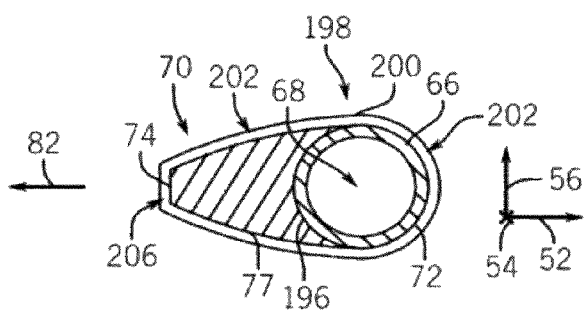
FIG. 15 is a cross-sectional top view of an embodiment of an aerodynamic wake reducer taken along line 14-14 of FIG. 13.

FIG. 15 is a top cross-sectional view of an embodiment of the aerodynamic wake reducer 70 taken along line 14-14 of FIG. 13. As shown in FIG. 15, the aerodynamic wake reducer 70 has a truncated trailing edge 74. In other words, the trailing edge 74 may have a flat surface 206 perpendicular to the airflow 64. Such a configuration of the aerodynamic wake reducer 70 may be less complicated and/or less expensive to manufacture than aerodynamic wake reducers 70 with tapered trailing edges 74. Despite the differences in the shapes of the trailing edges 74 shown in FIGS. 14 and 15, both may help to reduce wakes in the downstream airflow 82 flowing around the cross-fire tube 66. In other respects, the aerodynamic wake reducer 70 shown in FIG. 15 is similar to that shown in FIG. 14.

Figure 16:
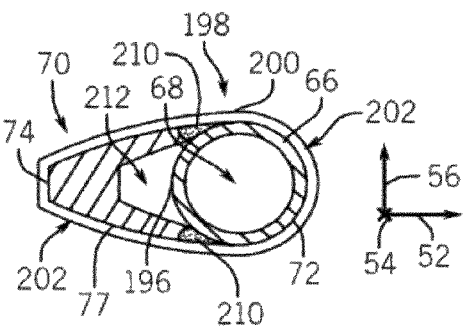
FIG. 16 is a cross-sectional top view of an embodiment of an aerodynamic wake reducer taken along line 14-14 of FIG. 13.

FIG. 16 is a top cross-sectional view of an embodiment of the aerodynamic wake reducer 70 taken along line 14-14 of FIG. 13. As shown in FIG. 16, the aerodynamic wake reducer 70 has a truncated trailing edge 74. In addition, the aerodynamic wake reducer 70 is coupled to the cross-fire tube 66 at two weld seams 210. As discussed above, other methods may be used to couple the aerodynamic wake reducer 70 to the cross-fire tube 66 or both may be formed from one bar stock. Further, the aerodynamic wake reducer 70 includes an internal chamber or opening 212, which may be configured to reduce the overall weight and/or cost of the aerodynamic wake reducer 70.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
a gas turbine combustor, comprising:
a combustion liner disposed about a combustion region;
a flow sleeve disposed about the combustion liner;
an air passage between the combustion liner and the flow sleeve;
a structure extending completely between the combustion liner and the flow sleeve in the air passage, wherein the structure obstructs an airflow path through the air passage; and
an aerodynamic wake reducer in the air passage, wherein the aerodynamic wake reducer is configured to redirect an airflow around the structure to reduce a wake region associated with and downstream of the structure, the aerodynamic wake reducer comprises a leading edge and a trailing edge, the leading edge faces toward the airflow path, the trailing edges faces away from the airflow path, and a trailing edge angle of the aerodynamic wake reducer is less than a leading edge angle of the aerodynamic wake reducer.

2. The system of claim 1, wherein the aerodynamic wake reducer comprises a flow control surface extending at least partially around the structure, and the flow control surface has an aerodynamic shape.

3. The system of claim 2, wherein the flow control surface comprises first and second surfaces disposed on opposite first and second sides of the structure, the first surface extends between the leading edge and the trailing edge on the first side of the structure, and the second surface extends between the leading edge and the trailing edge on the second side of the structure.

4. The system of claim 3, wherein the first and second surfaces converge toward one another along the airflow path toward the trailing edge.

5. The system of claim 1, wherein the aerodynamic wake reducer comprises a flow control surface that curves around the structure from the leading edge to the trailing edge of the structure.

6. The system of claim 5, wherein the structure comprises an elongated structure having a curved cross-section, and the flow control surface comprises an airfoil shaped cross-section disposed about the curved cross-section.

7. The system of claim 5, wherein the structure comprises an elongated structure having a rectangular cross-section, and the flow control surface comprises an airfoil shaped cross-section disposed about the rectangular cross-section.

8. The system of claim 5, wherein the aerodynamic wake reducer comprises an airfoil shaped wall having the flow control surface, the airfoil shaped wall is disposed at an offset distance from an exterior surface of the structure, and at least one support extends between the structure and the airfoil shaped wall.

9. The system of claim 1, comprising a fuel injector disposed downstream of the combustion liner and the flow sleeve in an annulus formed by a cap, wherein the fuel injector obstructs the airflow path through the air passage downstream from the structure, and the aerodynamic wake reducer is configured to reduce a wake in the airflow from the structure.

10. The system of claim 1, wherein the structure comprises a cross-fire tube, a flame detector, a spark plug, a boss, a spacer, a pressure probe, an axially staged air injector, a sensor, or a combination thereof.

11. The system of claim 1, wherein the structure and the aerodynamic wake reducer are a one-piece structure.

12. The system of claim 1, wherein the structure comprises a first alignment feature, the aerodynamic wake reducer comprises a second alignment feature, and the first and second alignment features mate with one another to align the aerodynamic wake reducer with the airflow path.

13. A system, comprising:
an aerodynamic turbine wake reducer configured to reduce a wake in a wake region downstream from a structure obstructing a gas flow in a gas flow passage of a gas turbine engine, wherein the structure extends completely between a combustion liner and a flow sleeve in the gas flow passage, wherein the aerodynamic turbine wake reducer comprises a flow control surface configured to at least partially surround the structure, the aerodynamic turbine wake reducer is configured to mount upstream of a fuel injector disposed in the gas flow passage, the aerodynamic wake reducer comprises a leading edge and a trailing edge, the leading edge faces toward the gas flow, the trailing edges faces away from the gas flow, and a trailing edge angle of the aerodynamic wake reducer is less than a leading edge angle of the aerodynamic wake reducer.

14. The system of claim 13, wherein the flow control surface comprises an airfoil shaped cross-section.

15. The system of claim 13, wherein the structure and the flow control surface collectively define an airfoil shaped cross-section.

16. The system of claim 13, wherein the aerodynamic turbine wake reducer comprises a first component and a second component, and wherein the first and second components couple with one another around the structure.

17. A method, comprising:
reducing a wake in a wake region downstream from a structure that obstructs an airflow along an airflow passage between a combustion liner and a flow sleeve of a gas turbine combustor using an aerodynamic wake reducer coupled to the structure, wherein the structure extends completely between the combustion liner and the flow sleeve in the airflow passage, and wherein reducing the wake comprises:
flowing the airflow toward a leading edge of the aerodynamic wake reducer;
dividing the airflow into a first flow and a second flow around the structure in the airflow passage;
aerodynamically combining the first and second flows into the wake region in the airflow passage downstream of the structure; and
flowing the airflow away from a trailing edge of the aerodynamic wake reducer, wherein a trailing edge angle of the aerodynamic wake reducer is less than a leading edge angle of the aerodynamic wake reducer.

18. The method of claim 17, comprising flowing the first and second flows about opposite paths along an aerodynamic flow control surface, wherein the aerodynamic flow control surface at least partially surrounds the structure.

19. The method of claim 18, comprising injecting a fuel from a fuel injector downstream of the aerodynamic flow control surface, wherein the fuel injector is disposed downstream of the combustion liner and the flow sleeve in an annulus formed by a cap.

20. The system of claim 1, wherein the gas turbine combustor comprises a first flow direction of combustion gases in the combustion region and a second flow direction of air along the airflow path, wherein the first and second directions are opposite from one another.

21. A system, comprising:
a gas turbine combustor, comprising:
a combustion liner disposed about a combustion region;
a flow sleeve disposed about the combustion liner;
an air passage between the combustion liner and the flow sleeve;
a structure extending between the combustion liner and the flow sleeve in the air passage, wherein the structure obstructs an airflow path through the air passage;
an aerodynamic wake reducer in the air passage, wherein the aerodynamic wake reducer is configured to redirect an airflow around the structure to reduce a wake region associated with and downstream of the structure; and
a fuel injector disposed downstream of the combustion liner and the flow sleeve in an annulus formed by a cap, wherein the fuel injector obstructs the airflow path through the air passage downstream from the structure, and the aerodynamic wake reducer is configured to reduce a wake in the airflow from the structure.

22. A method, comprising:
reducing a wake in a wake region downstream from a structure that obstructs an airflow along an airflow passage between a combustion liner and a flow sleeve of a gas turbine combustor using an aerodynamic wake reducer coupled to the structure, wherein reducing the wake comprises:
dividing the airflow into a first flow and a second flow around the structure in the airflow passage;
aerodynamically combining the first and second flows into the wake region in the airflow passage downstream of the structure;
comprising flowing the first and second flows about opposite paths along an aerodynamic flow control surface, wherein the aerodynamic flow control surface at least partially surrounds the structure; and
injecting a fuel from a fuel injector downstream of the aerodynamic flow control surface, wherein the fuel injector is disposed downstream of the combustion liner and the flow sleeve in an annulus formed by a cap.

* * * * *